(12) United States Patent
Rumreich et al.

(10) Patent No.: US 6,947,099 B2
(45) Date of Patent: Sep. 20, 2005

(54) AUTOMATIC CHROMA CONTROL CIRCUIT WITH CONTROLLED SATURATION REDUCTION

(75) Inventors: Mark Francis Rumreich, Indianapolis, IN (US); Ronald Thomas Keen, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 696 days.

(21) Appl. No.: 09/745,223

(22) Filed: Dec. 21, 2000

(65) Prior Publication Data

US 2002/0080282 A1 Jun. 27, 2002

(51) Int. Cl.$^7$ ............................. H04N 5/21; H04N 9/68
(52) U.S. Cl. ..................... 348/647; 348/645; 348/679; 348/624
(58) Field of Search ................................ 348/647, 645, 348/646, 648, 621, 624, 623, 679; H04N 5/21, 9/68

(56) References Cited

U.S. PATENT DOCUMENTS

| | | | |
|---|---|---|---|
| 3,740,456 A | | 6/1973 | Harwood ............... 178/5.4 SD |
| 3,764,734 A | * | 10/1973 | Srivastava et al. .......... 348/648 |
| 3,961,361 A | | 6/1976 | Avins et al. ................... 358/27 |
| 3,967,313 A | * | 6/1976 | Miyamoto ................... 348/648 |
| 4,038,684 A | | 7/1977 | Miyamoto |
| 4,054,905 A | | 10/1977 | Harwood et al. ............. 358/27 |
| 4,183,047 A | * | 1/1980 | Kim et al. ................... 348/648 |
| 4,219,839 A | * | 8/1980 | Watanabe ................... 348/647 |
| 4,466,015 A | * | 8/1984 | Wargo et al. ............... 348/646 |
| 4,602,276 A | * | 7/1986 | Fling et al. ................. 348/646 |
| 4,635,102 A | * | 1/1987 | Bolger ........................ 348/646 |
| 4,672,428 A | * | 6/1987 | Freyberger et al. |
| 4,785,346 A | * | 11/1988 | Yoshimochi ................ 348/647 |
| 5,392,074 A | | 2/1995 | Watanabe et al. |
| 5,654,769 A | * | 8/1997 | Ohara et al. ................ 348/644 |
| 6,177,962 B1 | * | 1/2001 | Rumreich et al. .......... 348/648 |
| 6,219,485 B1 | * | 4/2001 | Choi .............................. 386/1 |
| 6,369,739 B1 | | 4/2002 | Inada et al. |
| 6,449,020 B1 | * | 9/2002 | Salle et al. ................. 348/645 |

* cited by examiner

*Primary Examiner*—John Miller
*Assistant Examiner*—Brian Yenke
(74) *Attorney, Agent, or Firm*—Joseph S. Tripoli; Robert D. Shedd; Paul P. Kiel

(57) ABSTRACT

An ACC system includes a controllable amplifier having an input coupled to receive a chroma input signal and an output for providing an chroma output signal of controllable amplitude. A first feedback path, including a cascade connection of means for providing a signal representative of a measured burst amplitude, means for providing an error signal representative of the difference between a desired burst amplitude and the measured burst amplitude, and an integrator, is coupled between the output of the controllable amplifier and a gain control input of the controllable amplifier. A second feedback path, coupled from an output of the integrator to an input thereof, reduces the gain of the amplifier means in a controlled manner for values of a burst component of the chroma input signal below a predetermined threshold value provided by a control signal source, the reduction being at a predetermined rate controlled by a scaling signal device, thereby providing an output system response characteristic having a precisely controllable knee and slope below a predetermined amplitude of a burst component of the chroma input signal.

10 Claims, 4 Drawing Sheets

AUTOMATIC CHROMA CONTROL CIRCUIT WITH CONTROLLED SATURATION REDUCTION

The present invention relates generally to automatic chroma control (ACC) circuits and particularly to ACC circuits of a type in which the saturation (amplitude) of a chrominance signal is reduced for relatively low burst component levels.

Automatic chrominance control circuits (hereafter "ACC circuits") are useful for regulating, or "normalizing," the chrominance signal level in a television apparatus to provide a relatively constant level. The relatively constant level facilitates subsequent chrominance signal processing operations such as demodulation, color control, matrixing, and the like. More specifically, automatic chrominance control circuits are usually designed to provide a chrominance output signal amplitude having a relatively constant burst amplitude for all reasonable burst input signal levels.

FIG. 1 illustrates an example of a conventional (Prior Art) ACC system. In the known system, a chroma signal (including a burst component) provided by chrominance signal source 10 is applied to chroma demodulator 12 via Automatic Chroma Control (ACC) circuit 14. ACC circuit 14 regulates the chroma output signal amplitude based on the burst amplitude of the chroma input signal from source 10.

ACC circuit 14 (outlined in phantom) comprises input 16, to which the output of chrominance signal source 10 is connected, and output 18 coupled to chroma demodulator 12, which produces demodulated color output signals Cr and Cb suitable for subsequent processing. The input 16 of ACC circuit 14 is coupled via gain controlled amplifier 20 to output 18. The gain of amplifier 20 is controlled by means of a burst keyed feedback path comprising burst gate 22, ACC detector 24 and ACC filter (or "integrator") 26.

During normal operation, the feedback path comprising burst gate 22 and ACC detector 24 regulates the level of the chrominance output signal provided by amplifier 20 at a substantially constant level for normal variations in the level of the burst component of the chrominance input signal provided by source 10. As noted below, the system of FIG. 1 also provides uncontrolled rolloff of the output signal at low burst amplitudes. An ACC system of this general type is used, for example, in the type LA7612 integrated circuit manufactured by Sanyo Corporation.

FIG. 2 illustrates another prior art system, wherein certain portions of the circuitry has been implemented using digital elements. In the system of FIG. 2, the level of the chrominance output signal remains substantially constant for all variations in the burst component.

The present invention resides in a first part in the recognition of a certain problem, here-to-fore not recognized in the prior art, and in a second part in the formulation of a unique solution to this newly recognized problem.

It would be advantageous in an ACC system to reduce the chroma gain for signals having relatively low burst amplitudes. This is because signals having relatively low burst amplitudes often have accompanying low luma amplitudes, so reducing chroma gain can help to avoid over-saturation. Further, signals having low burst amplitudes often have a poor signal-to-noise ratio, so reducing the chroma may also reduce the visibility of chroma noise in displayed images.

In accordance with an aspect of the invention, it has been found that certain prior art ACC circuits exhibit, to some degree, the positive side-effects of low-burst gain reduction mentioned above. It is believed that this occurs in the prior art circuit because the amplifier 20 tends to "run out of gain" for relatively low values of the burst amplitude. This reduces the loop gain and so the output signal tends to decrease for relative low values of the burst input signal amplitude.

The present invention recognizes that there is a problem, however, in simply relying on inadequate low-burst gain levels in the amplifier to provide the benefits of reduced saturation and reduced noise effects. The problem is that this characteristic in the prior art system has been found to be unpredictable as it may be highly dependent upon integrated circuit process variations. As such, this characteristic may vary between various ICs. Further, the unpredictable nature does not provide optimum ACC performance.

In more detail, FIG. 3 illustrates in further detail the nature of the problem to which the present invention is directed. This figure illustrates the ACC output level (normalized) as a function of the burst component amplitude (in IRE units) of the chroma input signal. As shown in FIG. 3, in the prior system, output 300 is relatively constant for burst levels above about 15 IRE. However, for relatively low values of burst amplitude, the point at which the gain reduction begins, or "knee" 302, is unpredictable in that knee 302 may occur at 5, 10 or even 15 IRE. Also, the output may assume an unpredictable slope 304 below knee 302. Such variations in the response characteristic of the known ACC system are believed to be due to IC processing variations. As noted above, these variations are undesirable for providing predictable performance. One might consider merely placing more strict limits on the IC processing. However, such a solution may be costly, complex and not practical.

Therefore, it is an object of the present invention to provide an ACC system in which the characteristic knee, or slope, or both are precisely controllable, thereby providing predictable performance.

Apparatus embodying the invention comprises a video signal processing apparatus, comprising: an amplifier having an input for receiving a chroma input signal, and an output for providing a chroma output signal; and a control circuit coupled to the amplifier for controlling the amplitude of a burst component of the output signal characterized in that the control circuit reduces the amplitude of the output signal in a controlled manner when the value of the burst component is below a predetermined value.

In accordance with a further aspect of the invention, the circuit means comprises a first feedback path coupled to the amplifier and a second feedback path coupled to the first feedback path.

In accordance with a further aspect of the invention, the first feedback path comprises a filter and the second feedback path is connected in parallel with the filter for controlling the values of a characteristic knee and/or slope characteristic of the apparatus for burst amplitudes below a given knee value.

In accordance with another aspect, the invention comprises an ACC system, comprising: a controllable amplifier having an input for receiving a chroma input signal, an output for providing an chroma output signal of controllable amplitude, and a gain control input; and a circuit for controlling the gain of the controllable amplifier, characterized in that the circuit comprises a first feedback path including a cascade connection of a means for providing a signal representative of a measured burst amplitude, a means for providing an error signal representative of the difference between a desired burst amplitude and the measured burst amplitude, and an integrator coupled between the output of the controllable amplifier and a gain control input of the controllable amplifier, for integrating the error signal, and a second feedback path coupled from an output of the integrator to an input of the integrator for reducing the gain of the amplifier at a predetermined rate for values of a burst component of the chroma input signal below a predetermined threshold value.

The foregoing and further features of the invention are described below and illustrated in the accompanying drawing, wherein like elements are denoted by like reference designators, and in which.

Figure 2:
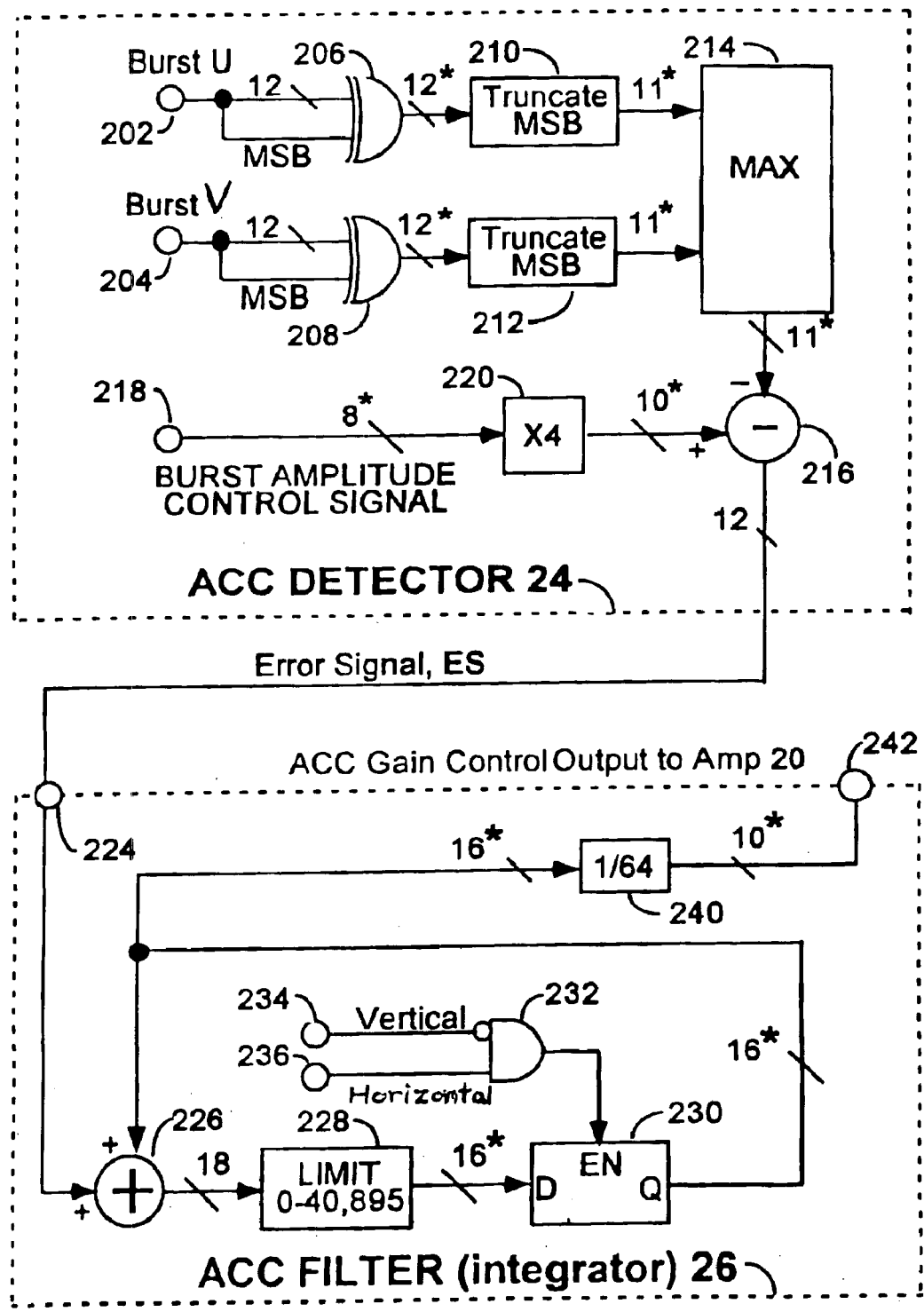
FIG. 2 is a circuit diagram of portions of a second conventional ACC system that does not exhibit any rolloff characteristics in response to burst amplitude variations.
Figure 4:
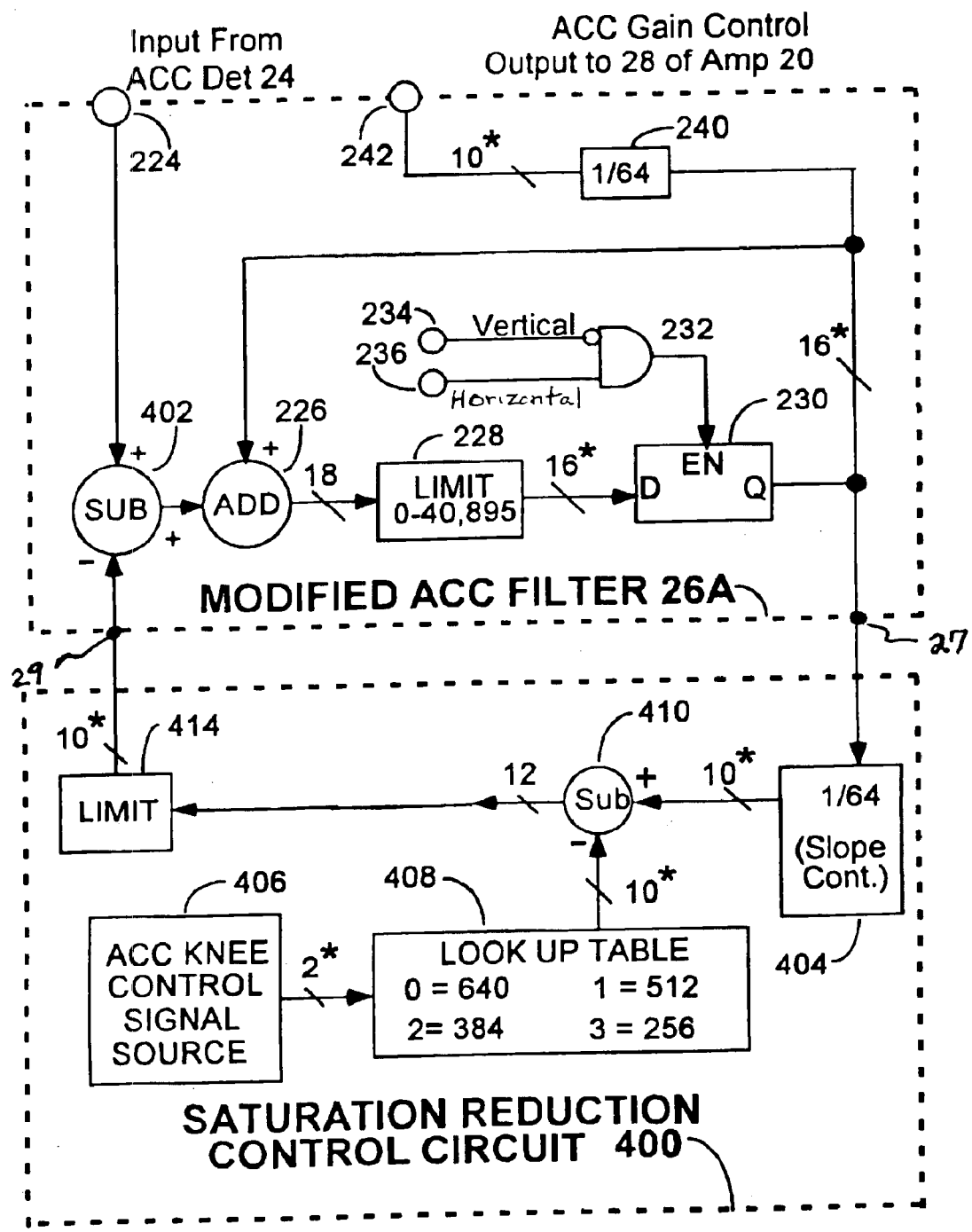
Figure 5:
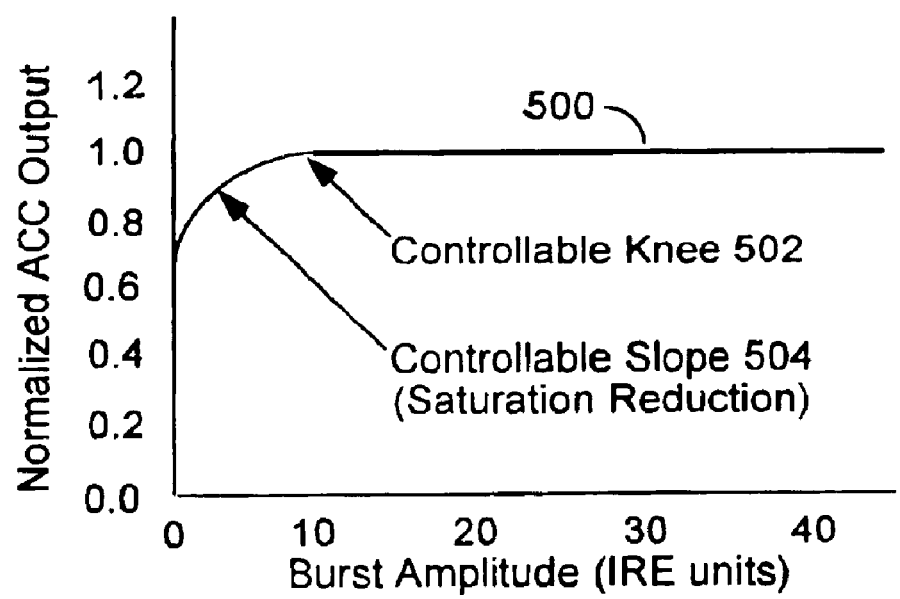

FIG. 4, embodying the invention, is a detailed circuit diagram illustrating modifications and additions to the ACC system of FIG. 2; and FIG. 5 is a diagram illustrating a characteristic response of the apparatus of FIG. 4, embodying the invention, wherein the knee and slope characteristics are precisely controlled.

It is helpful for understanding the present invention to first consider some details of the prior art circuit of FIG. 2, which illustrates detector 24 and filter or "integrator" 26. Detector 24 is shown and described in order to provide an understanding of how the system error signal ES is generated. Filter, or "integrator," 26 is shown and described in order to provide an understanding of how this element of the prior art system is modified in accordance with the present invention as discussed later with regard to FIG. 4.

A drawing convention used herein is that unsigned binary numbers are identified by an asterisk (*). Otherwise, two's complement numbers do not have an asterisk. A backward sloping hash mark indicates the number of bits carried by a bus.

Figure 1:
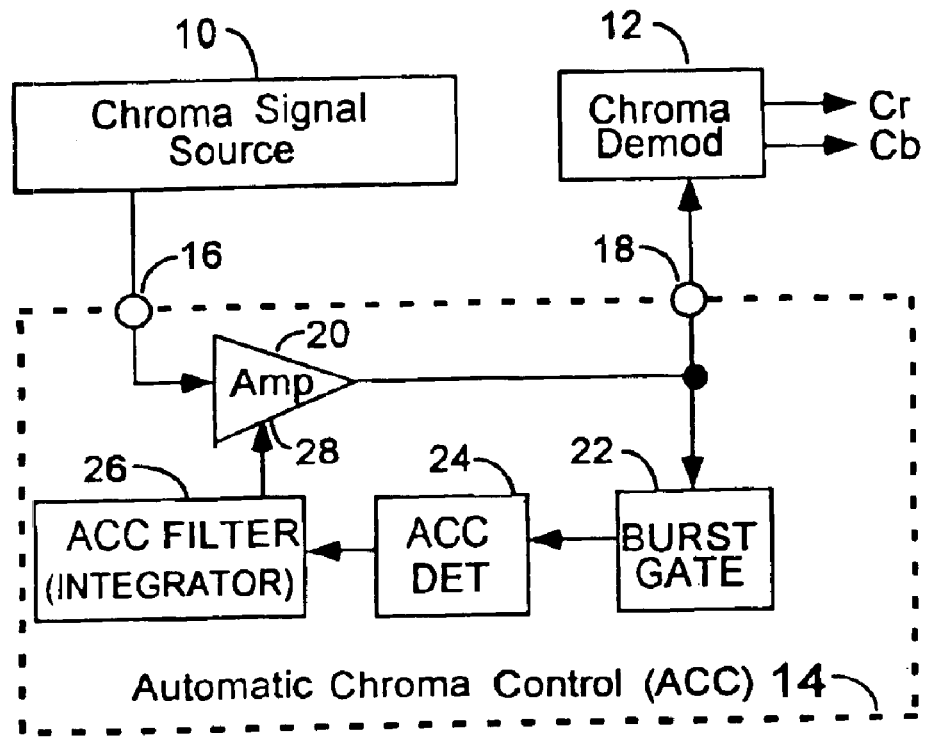
FIG. 1 is a simplified block diagram of a conventional ACC system that exhibits an uncontrolled rolloff characteristic in the output signal at low burst amplitudes.

In ACC Detector 24 (outlined in phantom) the illustrated burst U and burst V components at terminals 202 and 204 are the in-phase and quadrature-phase components of the burst vector. The burst vector components may be generated using any one of plurality of methods known to those skilled in the art, including, but not limited to, the burst gate shown in FIG. 1 or by using demodulated and accumulated Cr and Cb. The absolute values of these components are produced by exclusive OR gates 206 and 208, respectively, and are applied via respective truncation circuits 210 and 212 to maximum value circuit 214. The burst amplitude is the maximum of the absolute values of burst U and burst V and is an 11 bit (unsigned) signal provided at the output of maximum value circuit 214. The burst amplitude from maximum value circuit 214 is then subtracted from a constant in subtractor 216 to produce an error signal ES. The constant to subtractor 216 is provided by input 218 which receives an 8 bit unsigned control signal that is multiplied by 4 by multiplier 220 (e.g., a shift operation) for application to subtractor 216. This constant represents the desired burst output amplitude of the system. The 12 bit error signal ES at the output of subtractor 216 in the overall closed-loop system will drive the error signal to zero.

The 12 bit error signal ES provided by ACC detector 24 is then applied to input 224 of ACC filter (or "integrator" hereafter) 26. Integrator 26 includes a cascade connection of adder 226, limiter 228 and "D" type latch 230 with the 16 bit output of latch 230 fed back to an input of adder 226, which receives the error signal ES at its other input. Latch 230 is enabled by means of a signal from gate 232, which is supplied with the horizontal input and vertical input signals from terminals 236 and 234, respectively. The horizontal input signal is provided once per horizontal line after the burst vectors have been calculated. Since the vertical indicating signal at terminal 234 is applied to a negating input (circled) of gate 232, gate 232 is enabled to thus enable latch (or D flip flop) 230 only during active video intervals (when burst is present). Integrator 26 thus provides a desirable filtering action for the overall system and eliminates static gain errors. In other words, the error signal is driven to zero regardless of the ACC gain.

The output of latch 230 is scaled down by 1/64 by means of divider 240 (e.g., a six bit shifter) to produce an "ACC-Gain" control signal for application to output terminal 242 which, in turn, is coupled to the gain control input of amplifier 20. It will be noted that since this is a digital system, gain-controlled amplifier 20 may actually be implemented in digital form as what is known as a "variable gain block." Amplifier 20, or variable gain block, responds to the ACC-Gain control signal exponentially. More specifically, the gain is proportional to the number 2 raised to a power equal to the value of the ACC-Gain signal.

FIG. 4 illustrates an embodiment of the present invention. The present invention includes modified ACC filter 26A and saturation reduction control circuit 400 (outlined in phantom) comprising a first feedback path coupled to amplifier 20 and a second feedback path coupled to the first feedback path for reducing the amplitude of the ACC output signal in a controlled manner for values of input burst chroma component that are below a predetermined value. More specifically, the first feedback path includes subtractor 402, adder 226, limiter 228 and latch 230, which are coupled to ACC detector 24 and gain control input 28 of amplifier 28. The second feedback path includes unit 404, substractor 410 and limiter 414, which are coupled to modified ACC filter 26A.

Figure 3:
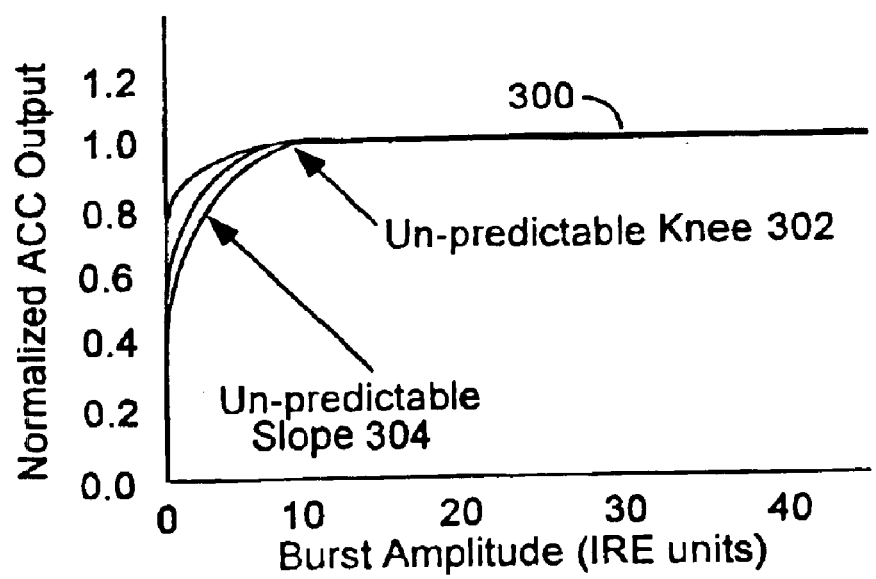
FIG. 3 is a diagram illustrating input/output characteristics of the ACC system of FIG. 1.

Advantageously, this configuration results in an ACC system characteristic response 500 shown in FIG. 5, which exhibits a controlled knee 502 and a controlled slope 504 for relatively low values of the input burst component. This is in contrast to the response of the prior art ACC system shown in FIG. 3 wherein the position of knee 302 and the slope 304 are both unpredictable because of the lack of any means for controlling those parameters.

In more detail, the purpose of the feedback path provided by saturation reduction control circuit 400 is to generate a gain-dependent offset that is applied to the input of integrator 26A. The application of a gain-dependent offset provides a controlled reduction in chroma gain for input burst components of relatively low amplitude. Saturation reduction control circuit 400 takes the output of the integrator 26A at output 27 and scales it by a predetermined factor (here, 1/64) in divider, or shift circuit 404. This operation controls the slope 504 of the response characteristic 500 below the knee 502.

ACC knee control signal source 406 provides a 2-bit control signal to look-up table 408. The ACC knee control signal may be provided, for example, by a microcontroller programmed as known in the art, or by other means known to those skilled in the art. The scaled integrator output signal provided by unit 404 is subtracted from the output of look-up table 408 by subtractor 410. The output of subtractor 410 is applied to and limited in limiter 414. Finally, the limited difference signal is applied to subtractor 402, via input 29, that has been added to integrator 26A. Subtractor 402 then subtracts, or offsets, the output of ACC detector 24. The output of subtractor 402 is then applied to adder 18 of the integrator and processed through the path comprising limiter 228 and latch 230.

In operation, the output of integrator 26A is indicative of the burst input amplitude (at the input of amplifier 20, or a gain controlled gain block). An offset, provided by circuit 400, to the input of integrator 26A is equivalent to changing the constant representing the desired burst amplitude (e.g., at terminal 18 of detector 24). Therefore, by "shaping" the output (Q) of integrator (226, 228, 230) and feeding it back to the input (via subtractor 402) of filter 26A, it is possible to achieve almost any desired gain versus burst amplitude characteristic.

Summarizing briefly, using the particular shaping network employed in control circuit 400, the scaled integrator output from 404 is offset in subtractor 410 by the programmable constant provided by source 406 and table 408 and the result is then limited to a positive range by limiter 414. Finally, the resulting value is subtracted by subtractor 402 from the integrator input. It will be noted that limiting the scaled and offset integrator to a positive range gives the desired flat characteristic above the knee 502. By changing the programmable offset constant, the burst amplitude at which gain reduction starts is programmable (e.g., by source 406). The scaling factor (e.g., 1/64) provided by the scaling unit 404 determines the slope 504 of the characteristic below the knee.

It will be apparent to those skilled in the art that although the present invention has been described in terms of an exemplary embodiment, modifications and changes may be made to the disclosed embodiment without departing from the essence of the invention. Therefore, it is to be understood that the present invention is intended to cover all modifications as would fall within the true scope and spirit of the present invention.

What is claimed is:

1. A video signal processing apparatus, comprising:
   an amplifier having an input for receiving a chroma input signal, an output for providing a chroma output signal;
   a control circuit coupled to the amplifier for controlling the amplitude of a burst component of the output signal characterized in that the control circuit reduces the amplitude of the output signal in a controlled manner when the value of the burst component is below a predetermined value.

2. Apparatus according to claim 1, characterized in that the control circuit comprises a first feedback path coupled to the amplifier and a second feedback path coupled to the first feedback path.

3. Apparatus according to claim 2, characterized in that the first feedback path comprises a filter and the second feedback path is connected in parallel with the filter for controlling the values of a characteristic knee and/or slope characteristic of the apparatus for burst amplitudes below a given knee value.

4. In a television apparatus, an ACC system, comprising:
   a controllable amplifier having an input for receiving a chroma input signal, an output for providing a chroma output signal of controllable amplitude, and a gain control input; and
   a circuit for controlling the gain of the controllable amplifier, characterized in that the circuit comprises a first feedback path including a cascade connection of a means for providing a signal representative of a measured burst amplitude, a means for providing an error signal representative of the difference between a desired burst amplitude and the measured burst amplitude, and an integrator, coupled between the output of the controllable amplifier and a gain control input of the controllable amplifier, for integrating the error signal, and
   a second feedback path coupled from an output of the integrator to an input of the integrator for reducing the gain of the amplifier at a predetermined rate for values of a burst component of the chroma input signal below a predetermined threshold value.

5. The ACC system according to claim 4, characterized in that the second feedback path includes:
   circuit means for scaling, offsetting and limiting the integrator output signal to provide a control signal; and
   means for applying the control signal to the input of the integrator.

6. The ACC system according to claim 4, characterized in that the means for providing a signal representative of a measured burst amplitude comprises a burst gate.

7. The ACC system according to claim 4, characterized in that the means for providing a signal representative of a measured burst amplitude comprises a chroma demodulator and a burst accumulator.

8. A video signal processing apparatus, comprising:
   an amplifier having an input for receiving a chroma input signal, an output for providing a chroma output signal;
   a control circuit coupled to the amplifier for controlling the amplitude of a burst component of the output signal characterized in that the control circuit reduces the amplitude of the output signal in a controlled manner when the value of the burst component is below a predetermined value, the control circuit comprising a first feedback path having a filter coupled to the amplifier and a second feedback path connected in parallel with the filter for controlling the values of a characteristic knee and/or slope characteristic of the apparatus for burst amplitudes below a given knee value.

9. A video signal processing apparatus, comprising:
   an amplifier having a first input for receiving a chroma input signal, a gain control input, and an output for providing a chroma output signal;
   a control circuit coupled to the gain control input of the amplifier for controlling the amplitude of a burst component of the output signal, wherein the control circuit detects when the value of the burst component is below a predetermined value and reduces the amplitude of the output signal in a controlled manner upon said detection.

10. The apparatus of claim 9, wherein the control circuit comprises a first feedback path coupled to the amplifier and a second feedback path coupled to the first feedback path, the first feedback path including a filter, the second feedback path including circuitry for providing a gain-dependent offset signal to the first feedback path for reducing the gain of the amplifier at a predetermined rate for values of the burst component of the chroma input signal below the predetermined value.

* * * * *